(12) United States Patent
Crowell et al.

(10) Patent No.: US 9,323,567 B2
(45) Date of Patent: Apr. 26, 2016

(54) OVERCOMMITTING VIRTUAL MACHINE HOSTS

(71) Applicant: International Business Machines Corporation, Armonk, NY (US)

(72) Inventors: Susan F. Crowell, Rochester, MN (US); Jason A. Nikolai, Rochester, MN (US); Andrew T. Thorstensen, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/496,999

(22) Filed: Sep. 25, 2014

(65) Prior Publication Data
US 2016/0092253 A1    Mar. 31, 2016

(51) Int. Cl.
*G06F 9/45*      (2006.01)
*G06F 9/455*    (2006.01)

(52) U.S. Cl.
CPC .... *G06F 9/45558* (2013.01); *G06F 2009/4557* (2013.01)

(58) Field of Classification Search
None
See application file for complete search history.

(56) References Cited

U.S. PATENT DOCUMENTS

| 8,359,223 | B2 | 1/2013 | Chi et al. | |
|---|---|---|---|---|
| 2006/0059253 | A1* | 3/2006 | Goodman | G06Q 10/10 709/223 |
| 2014/0047438 | A1 | 2/2014 | Da silva et al. | |

OTHER PUBLICATIONS

Abel Gordon et al., "Gingko: Automated, Application-Driven Memory Overcommitment for Cloud Computing," Proc. RESoLVE Workshop, 2011.
Amazon Elastic Compute Cloud, User Guide for Linux, API Version Jun. 15, 2014, Amazon Web Services.
Huan Liu's Blog, "Host server CPU utilization in Amazon EC2 cloud," Feb. 17, 2012, http://huanliu.wordpress.com/2012/02/17/host-server-cpu-utilization-in-amazon-ec2-cloud/.
"Amazon EC2 Pricing," printed Apr. 9, 2014, http://aws.amazon.com/ec2/pricing/.

* cited by examiner

*Primary Examiner* — Chuck Kendall
(74) *Attorney, Agent, or Firm* — Matthew C. Zehrer

(57) ABSTRACT

A host-side overcommit value is set upon a physical node that implements virtual machines (VM Node). The overcommit value is determined by receiving a selected enablement template that includes a selected computing capacity and a selected overcommit value. A user-side normalization factor is determined that normalizes the selected computing capacity against a reference data handling system. A comparable computing capacity of the VM Node is determined. A host-side normalization factor is determined that normalizes the comparable computing capacity against the reference data handling system. The host-side overcommit value is determined from the selected overcommit value, the user-side normalization factor, and the host-side normalization factor. The host-side overcommit value may indicate the degree the comparable computing capacity is overcommitted to virtual machines deployed upon heterogeneous VM Nodes as normalized against the reference system.

10 Claims, 9 Drawing Sheets

| Node | CPU Speed | CPU Cores | Mem Clk Speed | Mem Size | Disk Speed | Disk Size | Overcommit |
|---|---|---|---|---|---|---|---|
| Reference Node 370 | 3.0 Ghz | 10 | 266 Mhz | 1 Tb | 1,030 Mbits/sec | 100 Tb | NA |
| TEMPLATE 300A | 2.0 Ghz | 4 - 6 | 266 Mhz | 400 Gb - 1 Tb | 1,030 Mbits/sec | 20 Tb - 80 Tb | 3 |
| TEMPLATE 300B | 2.0 Ghz | 6 - 8 | 266 Mhz | 500 Gb - 2 Tb | 1,030 Mbits/sec | 80 Tb - 500 Tb | 2 |
| TEMPLATE 300C | 4.0 Ghz | 8 - 20 | 266 Mhz | 4 Tb - 20 Tb | 1,030 Mbits/sec | 500 Tb - 800 Tb | 1 |

FIG. 7

| Node | vCPU | vCPU US-Norm Factor |
|---|---|---|
| Reference Node 370 | 60 | NA |
| TEMPLATE 300A | 15 - 24 | 0.25 - 0.4 |
| TEMPLATE 300B | 24 - 32 | 0.4 - 0.53 |
| TEMPLATE 300C | 63 - 160 | 1.05 - 2.67 |

FIG. 8A

| Node | vMEM | vMEM US-Norm Factor |
|---|---|---|
| Reference Node 370 | 100 | NA |
| TEMPLATE 300A | 40 - 100 | 0.4 - 1.0 |
| TEMPLATE 300B | 50 - 100 | 0.5 - 2.0 |
| TEMPLATE 300C | 400 - 2000 | 4 - 20 |

FIG. 8B

| Node | vDISK | vDISK US-Norm Factor |
|---|---|---|
| Reference Node 370 | 50 | NA |
| Node 375-A | 10 - 40 | 0.2 - 0.8 |
| Node 375-B | 40 - 250 | 0.8 - 5 |
| Node 375-C | 250 - 400 | 5 - 8 |

FIG. 8C

| Node | US-Norm Factor |
|---|---|
| Reference Node 370 | NA |
| TEMPLATE 300A | 0.243 - 0.428 |
| TEMPLATE 300B | 0.408 - 0.634 |
| TEMPLATE 300C | 1.205 - 3.417 |

FIG. 8D

| Node | CPU Speed | CPU Cores | Mem Clk Speed | Mem Size | Disk Speed | Disk Size |
|---|---|---|---|---|---|---|
| Reference Node 370 | 3.0 Ghz | 10 | 266 Mhz | 1 Tb | 1,030 Mbits/sec | 100 Tb |
| Node 375-A | 2.0 Ghz | 6 | 266 Mhz | 400 Gb | 1,030 Mbits/sec | 20 Tb |
| Node 375-B | 2.0 Ghz | 8 | 266 Mhz | 500 Gb | 1,030 Mbits/sec | 50 Tb |
| Node 375-C | 4.0 Ghz | 20 | 266 Mhz | 4 Tb | 1,030 Mbits/sec | 500 Tb |

*FIG. 9*

| Node | vCPU | vCPU HS-Norm Factor |
|---|---|---|
| Reference Node 370 | 60 | NA |
| Node 375-A | 24 | 0.4 |
| Node 375-B | 32 | 0.53 |
| Node 375-C | 160 | 2.67 |

*FIG. 10A*

| Node | vMEM | vMEM HS-Norm Factor |
|---|---|---|
| Reference Node 370 | 100 | NA |
| Node 375-A | 40 | 0.2 |
| Node 375-B | 50 | 0.5 |
| Node 375-C | 400 | 4 |

*FIG. 10B*

| Node | vDISK | vDISK HS-Norm Factor |
|---|---|---|
| Reference Node 370 | 50 | NA |
| Node 375-A | 10 | 0.2 |
| Node 375-B | 25 | 0.5 |
| Node 375-C | 250 | 5 |

*FIG. 10C*

| Node | HS-Norm Factor |
|---|---|
| Reference Node 370 | NA |
| Node 375-A | 0.37 |
| Node 375-B | 0.529 |
| Node 375-C | 2.747 |

*FIG. 10D*

OVERCOMMITTING VIRTUAL MACHINE HOSTS

FIELD OF THE INVENTION

Embodiments of the invention generally relate to data handling systems and more particularly to hosts of virtual machines, logical partitions, etc. that overcommit greater physical resources than available to one or more virtual resources.

DESCRIPTION OF THE RELATED ART

A virtualized computing environment may include a hypervisor or virtual machine manager that supports overcommitting computing resources such as CPUs, memory, disk, and certain networking elements. Overcommitting is allocating more virtualized resources than there are physical resources in the environment. For example, since most processes do not access 100% of allocated virtual memory all the time, the hypervisor can allocate more memory for virtual machines than the host physical machine actually has available. By overcommitting the physical resources, under-utilized virtual machines can run on fewer physical systems, with the net effect of less power, cooling, and investment in physical hardware.

Infrastructure as a Service (IaaS) cloud computing provides the capability to provision processing, storage, networks, and other fundamental computing resources. IaaS cloud computing can be deployed as a public, private, or hybrid cloud. Public IaaS clouds provide resources to any customer willing to pay per usage. Private IaaS cloud environments utilize the same technology as public clouds, but are controlled completely within an organization and are not accessible by the public. Hybrid IaaS clouds are made up of a combination of public and private IaaS clouds. In all the deployment models, users of the cloud, are able to deploy and run arbitrary software, which can include operating systems and applications.

An important aspect of cloud computing is that the cloud customer (or tenant) does not manage or control the underlying cloud infrastructure but has control over operating systems, storage, deployed applications, and possibly limited control of select networking components. Organizations hosting cloud environments continue to strive to reduce costs by increasing hardware utilization. In order to accomplish this goal, many of these organizations are turning toward utilizing IaaS cloud solutions.

To reduce costs and optimize hardware usage, IaaS administrators may overcommit system resources. However, the degree of overcommit is difficult to manage. Setting a overcommit value too high will result in poor physical system performance. Setting the overcommit value too low results in inefficient use of resources. In other words, setting overcommits values for physical systems in an IaaS environment is non-trivial.

SUMMARY

In a first embodiment of the present invention, a method to overcommit a physical node implementing a plurality of virtual machines (VM Node) includes receiving, with a management console, a selected enablement template comprising a selected computing capacity and a selected overcommit value, determining, with the management console, a user-side normalization factor to normalize the selected computing capacity against a physical reference node, receiving, with the management console, a comparable computing capacity of the VM Node, determining, with the management console, a host-side normalization factor to normalize the comparable computing capacity against the reference node, and setting, with the management console, a host-side overcommit value upon the VM Node as determined from the selected overcommit value, the user-side normalization factor, and the host-side normalization factor.

In another embodiment of the present invention, a computer program product for overcommitting the VM Node includes a computer readable storage medium having program instructions embodied therewith readable to cause a management console to receive the selected enablement template comprising the selected computing capacity and the selected overcommit value, determine the user-side normalization factor to normalize the selected computing capacity against the physical reference node, receive a comparable computing capacity of the VM Node, determine the host-side normalization factor to normalize the comparable computing capacity against the reference node, and set the host-side overcommit value upon the VM Node as determined from the selected overcommit value, the user-side normalization factor, and the host-side normalization factor.

In yet another embodiment of the present invention, a virtual machine data handling network includes the physical reference node comprising a physical resource having an associated reference computing capacity, a VM Node comprising a comparable physical resource having an associated host computing capacity, a management console comprising a selected enablement template comprising a selected computing capacity and a selected overcommit value, wherein the management console is configured to determine the user-side normalization factor to normalize the selected computing capacity against the reference computing capacity, determine the host-side normalization factor to equate the comparable computing capacity to the reference computing capacity, determine the host-side overcommit value from the selected overcommit value, the user-side normalization factor, and the host-side normalization factor, and to set the host-side overcommit value to the VM Node.

BRIEF DESCRIPTION OF THE DRAWINGS

FIG. 7 illustrates exemplary node enablement templates, in accordance with embodiments of the present invention.

FIG. 8A-FIG. 8D illustrate normalizing node enablement templates to a reference node, in accordance with embodiments of the present invention.

FIG. 9 illustrates exemplary benchmark results measuring the performance of various nodes, in accordance with embodiments of the present invention.

FIG. 10A-FIG. 10D illustrates normalizing heterogeneous nodes to a reference node, in accordance with embodiments of the present invention.

DETAILED DESCRIPTION

Figure 1:
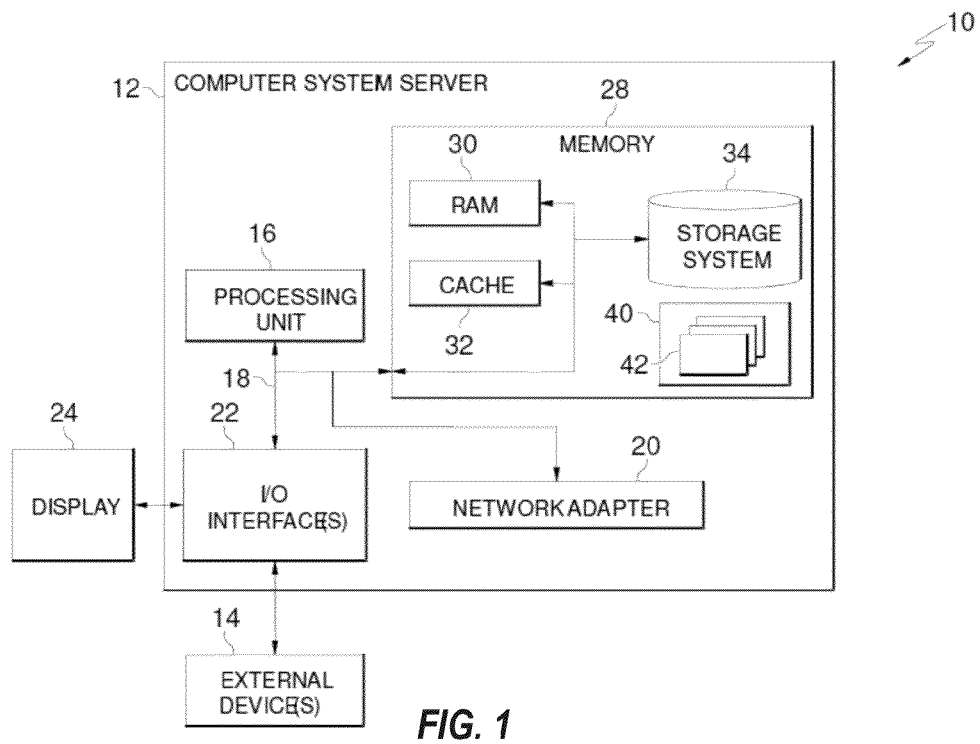
FIG. 1 depicts a cloud computing node according to an embodiment of the present invention.

Embodiments of the invention may relate to setting overcommit values in a cloud computing environment that includes heterogeneous nodes that host virtual machines. In embodiments, host nodes in the cloud environment are benchmarked to determine relative computing resource performance. Normalized overcommit values may be associated with each host node based upon, at least, the benchmarking. In embodiments, the host node may be deployed within a node group based upon, at least, the associated normalized overcommit value. Such embodiments allow for the setting of a normalized node specific overcommit value based upon the relative performance of the specific node and for implementing per node overcommit rates within increasingly complex cloud environments comprising numerous nodes without the need for complex management.

In embodiments, over commits may be set on a per physical node basis as opposed to one overcommit value applied to all physical nodes in the cloud. The reference node performance characteristics may be benchmarked to set over commit values on each individual physical node in the cloud. The overcommit value may be set for multiple resources (memory, CPU, etc) of each node.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein. Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
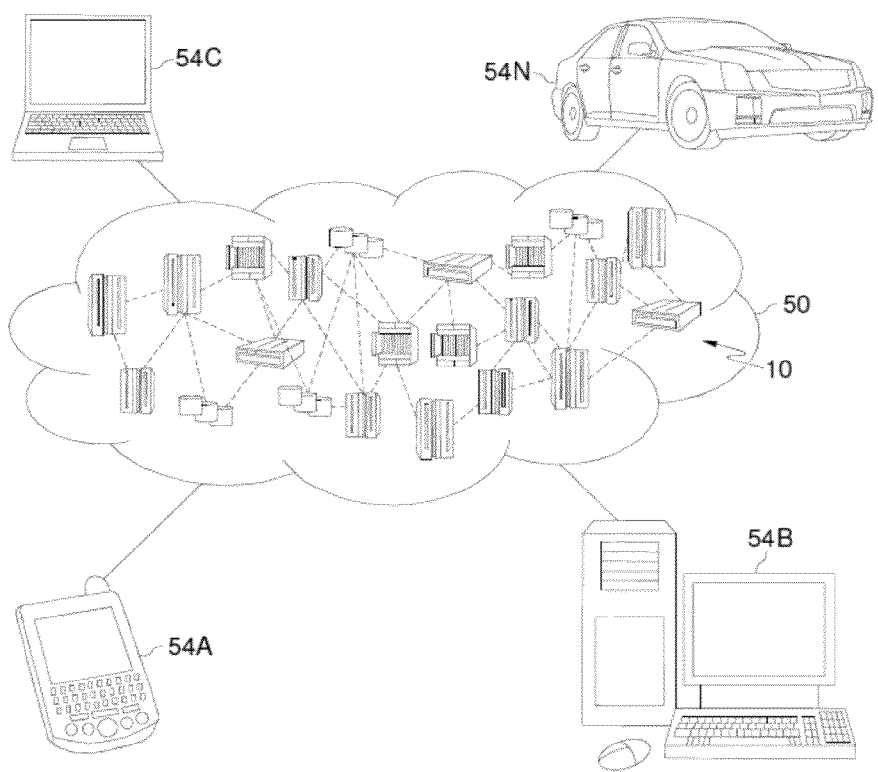
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
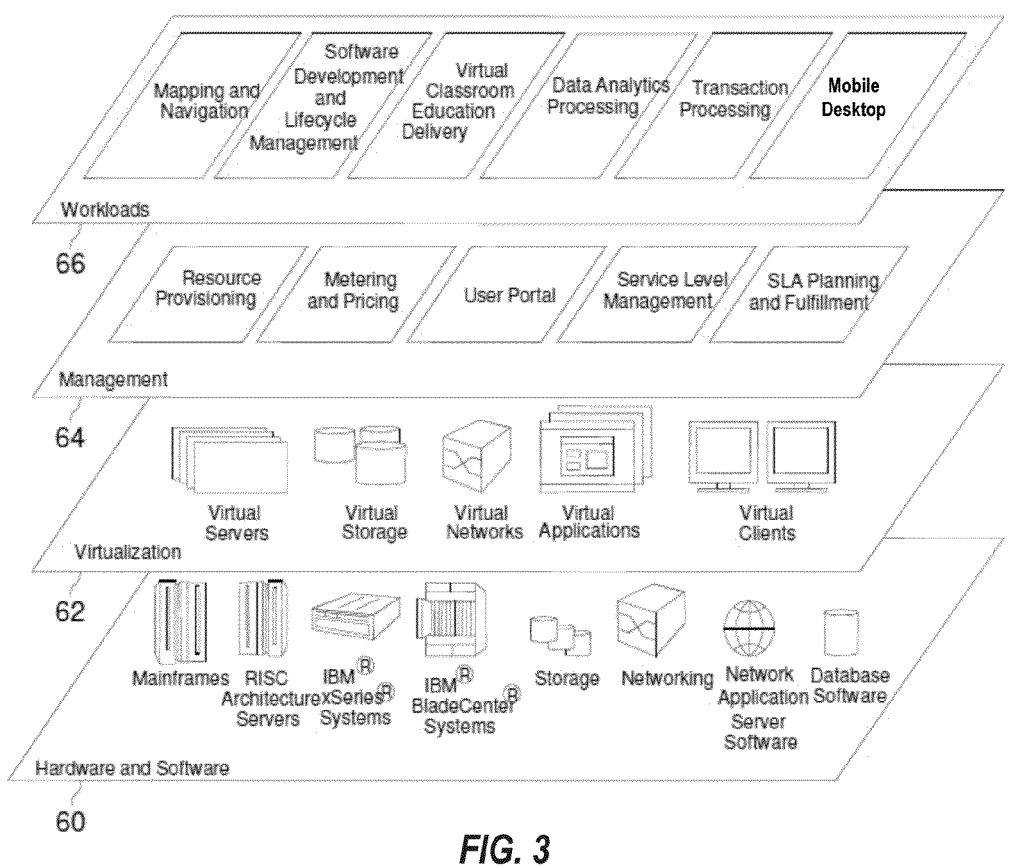
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; mobile desktop.

Figure 4:
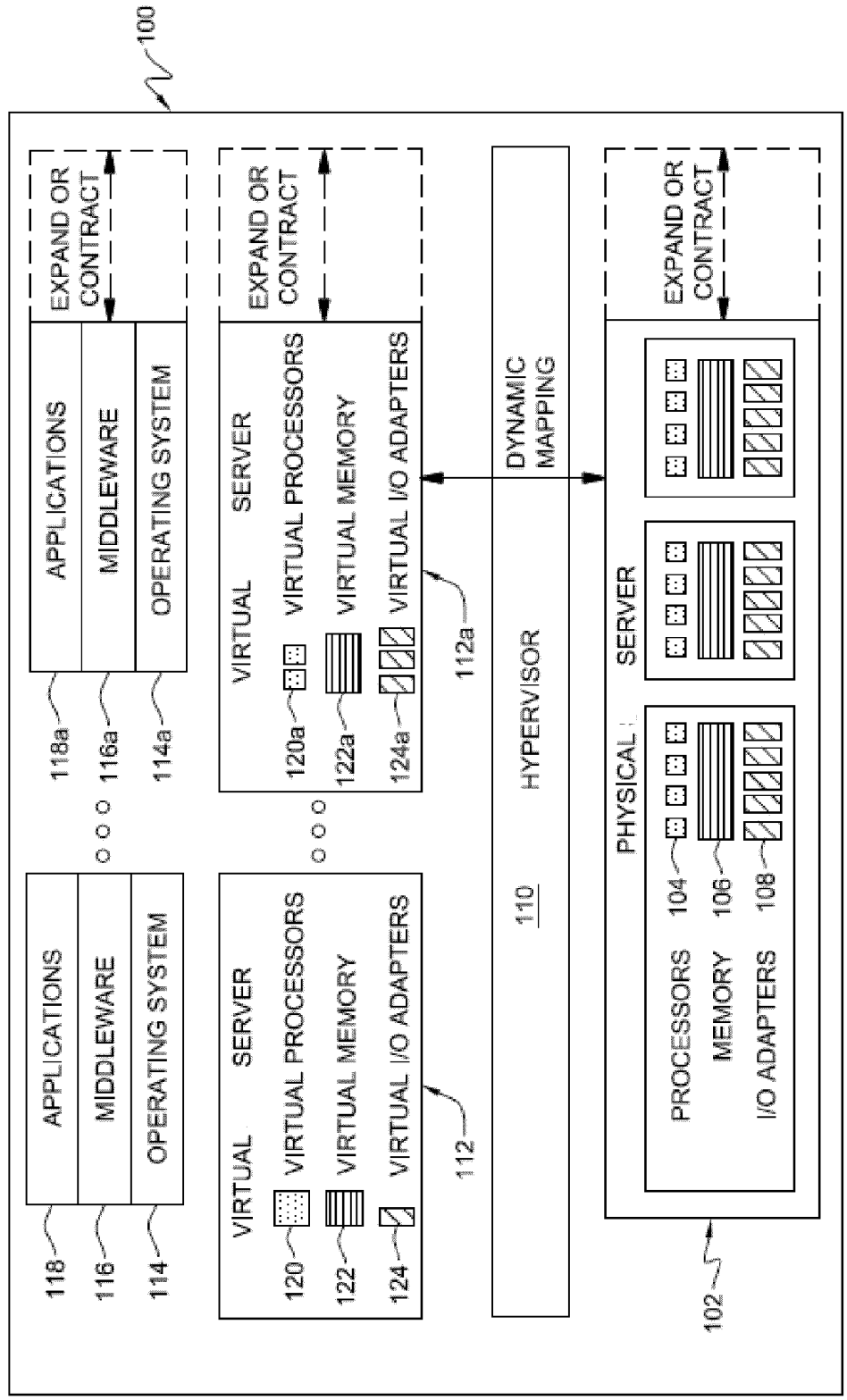
FIG. 4 is a block diagram of an exemplary data processing system to implement one or more embodiments of the present invention.

FIG. 4 is a block diagram of a data processing system 100, which in one example, is a multiprocessing server computer system, computing node 10, etc. System 100 includes physical hardware devices that can be mapped to, i.e., temporarily owned by, a user application to execute that application.

System 100 includes a physical computer system 102. Physical system 102 includes physical hardware devices such as processor 104, memory 106, and I/O adapters 108. These physical devices are managed by hypervisor 110. Processors 104 are shared processors and each may be a simultaneous multithreading capable processor that is capable of concurrently executing multiple different threads on the processor. Hypervisor 110 may also be referred to as a virtual machine manager, virtual machine monitor, managing partition, an operating system 114 within a dedicated virtual machine, etc. For example, the functionality of hypervisor 110 described herein may accomplished by e.g., a managing partition.

A virtual server is a proxy for a physical server that has the same capabilities, interfaces, and state. Virtual servers are created and managed by a hypervisor that resides on physical system 100. A virtual server appears to be a physical server to its user: the operating system, middleware, and application software that run upon it. System 100 includes one or more virtual servers such as virtual server 112.

Each virtual server appears to its software to include its own processor(s), memory, and I/O adapter(s) that are available for the exclusive use of that virtual server. For example, virtual server 112 includes a virtual processor 120, virtual memory 122, and virtual I/O adapters 124. Virtual server 112a includes virtual processors 120a, virtual memory 122a, and virtual I/O adapters 124a.

Each virtual server supports its own software environment, including an operating system, middleware, and applications. The software environment of each virtual server can be different from the software environment of other virtual servers. For example, the operating systems executed by each virtual server may differ from one another.

For example, virtual server 112 supports operating system 114, middleware 116, and applications 118. Virtual server 112a supports operating system 114a, middleware 116a, and applications 118a. Operating systems 114 and 114a may be the same or different operating systems.

A virtual server is a logical description of a server that defines a server environment that acts, to a user, as if it were a physical server, being accessed and providing information in the same way as a physical server. The virtual processors, virtual memory, and virtual I/O adapters that are defined for each virtual server are logical substitutes for physical processors, memory, and I/O adapters.

Hypervisor 110 manages the mapping between the virtual servers with their virtual processors, virtual memory, and virtual I/O adapters and the physical hardware devices that are selected to implement these virtual devices. For example, when a virtual processor is dispatched, a physical processor, such as one of physical processors 104, is selected by hypervisor 110 to be used to execute and implement that virtual processor. Hypervisor 110 manages the selections of physical devices and their temporary assignment to virtual devices.

Hypervisor 110 services all of the logical partitions during a dispatch time slice. The dispatch time slice is a particular length of time. During each dispatch time slice, hypervisor 110 will allocate, or assign, the physical processor to each logical partition. When the logical partition has been allocated time on the physical processor, the virtual processors defined by that logical partition will be executed by the physical processor.

Hypervisor 110 is responsible for dynamically creating, managing, and destroying virtual SMP servers. Whole virtual processors, virtual I/O adapters, and virtual memory blocks can be removed or added by hypervisor 110. Hypervisor 110 is also responsible for dynamic resource allocation, managing time-sharing of physical resources, and altering the physical resource mapped to a processor without involving the operating system. Hypervisor 110 is also able to dedicate physical resources to virtual resources for situations where sharing is not desired. Hypervisor 110 is responsible for managing the addition or removal of physical resources. Hypervisor 110 makes these additions and deletions transparent to the upper level applications.

Figure 5:
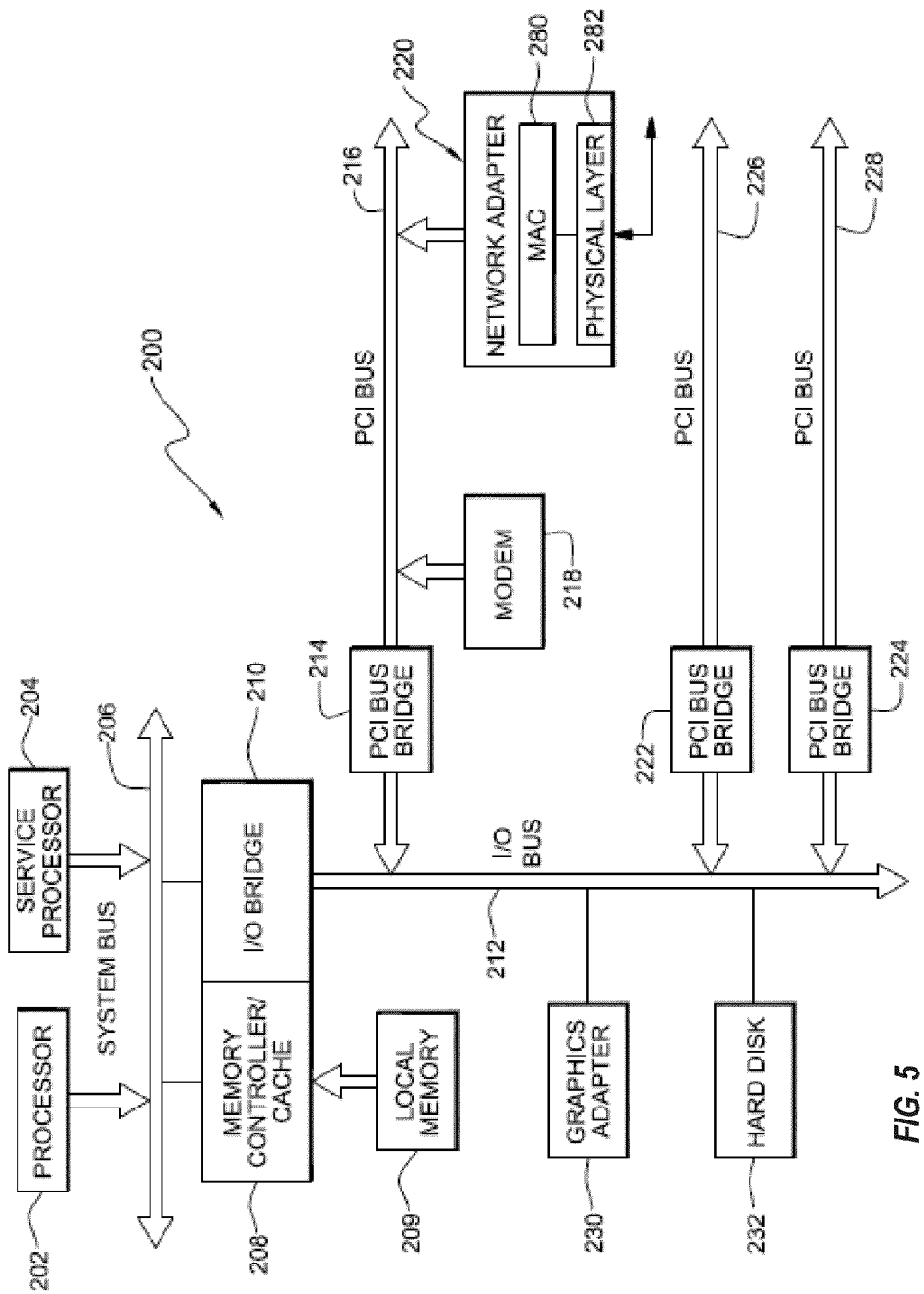
FIG. 5 is a more detailed illustration of a data processing system which could be used to implement one or more embodiments of the present invention.

FIG. 5 is a more detailed illustration of a computer system that may be used to implement the concepts described herein. Data processing system 200 may be a symmetric multiprocessor system including a plurality of shared processors or multi treading capable processors, such as processors 202 and 204 connected to system bus 206. Alternatively, a single processor system may be employed. In the depicted example, processor 204 is a service processor. Each processor may be capable of concurrently executing multiple hardware threads on the one processor.

Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers may be provided through modem 218 and network adapter 220 connected to PCI local bus 216 through add-in boards.

Network adapter 220 includes a physical layer 282 which conditions analog signals to go out to the network, such as for example, an Ethernet network for an R45 connector. A media access controller (MAC) 280 is included within network adapter 220. Media access controller (MAC) 280 is coupled to bus 216 and processes digital network signals. MAC 280 serves as an interface between bus 216 and physical layer 282. MAC 280 performs a number of functions involved in the transmission and reception of data packets. For example, during the transmission of data, MAC 280 assembles the data to be transmitted into a packet with address and error detection fields. Conversely, during the reception of a packet, MAC 280 disassembles the packet and performs address checking and error detection. In addition, MAC 280 typically performs encoding/decoding of digital signals transmitted and performs preamble generation/removal as well as bit transmission/reception.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Service processor 204 interrogates system processors, memory components, and I/O bridges to generate and inventory and topology understanding of data processing system 200. Service processor 204 also executes Built-In-Self-Tests (BISTs), Basic Assurance Tests (BATs), and memory tests on all elements found by interrogating a system processor, memory controller, and I/O bridge. Any error information for failures detected during the BISTs, BATs, and memory tests are gathered and reported by service processor 204.

Those of ordinary skill in the art will appreciate that the hardware depicted in FIG. 5 may vary. For example, other peripheral devices, such as optical disk drives and the like, also may be used in addition to or in place of the hardware depicted. The depicted example is not meant to imply architectural limitations with respect to the present invention.

The present invention may be executed within one of the computers or data processing systems depicted in FIG. 4, FIG. 5, etc. As a specific, commercially available example, a shared memory partition data processing system implementing hypervisor-managed paging such as described herein below can be built upon technologies found in IBM's p/i Series product line firmware and systemware, as described in the "Power Architecture Platform Reference" (PAPR) material Version 2.7, 9 Oct. 2007, which is hereby incorporated herein by reference. In addition, a virtual input/output server (VIOS) is commercially available as part of a PowerVM computing system offered by International Business Machines Corporation™. The VIOS allows sharing of physical resources between logical partitions, including virtual SCSI and virtual networking. This allows more efficient utilization of physical resources through sharing between logical partitions and facilitates server consolidation. For clarity, the shared memory partition is generally a partition or virtual machine sharing memory space (e.g., DRAM memory, FLASH memory, disk drive memory, etc.) with a distinct partition or virtual machine.

Figure 6:
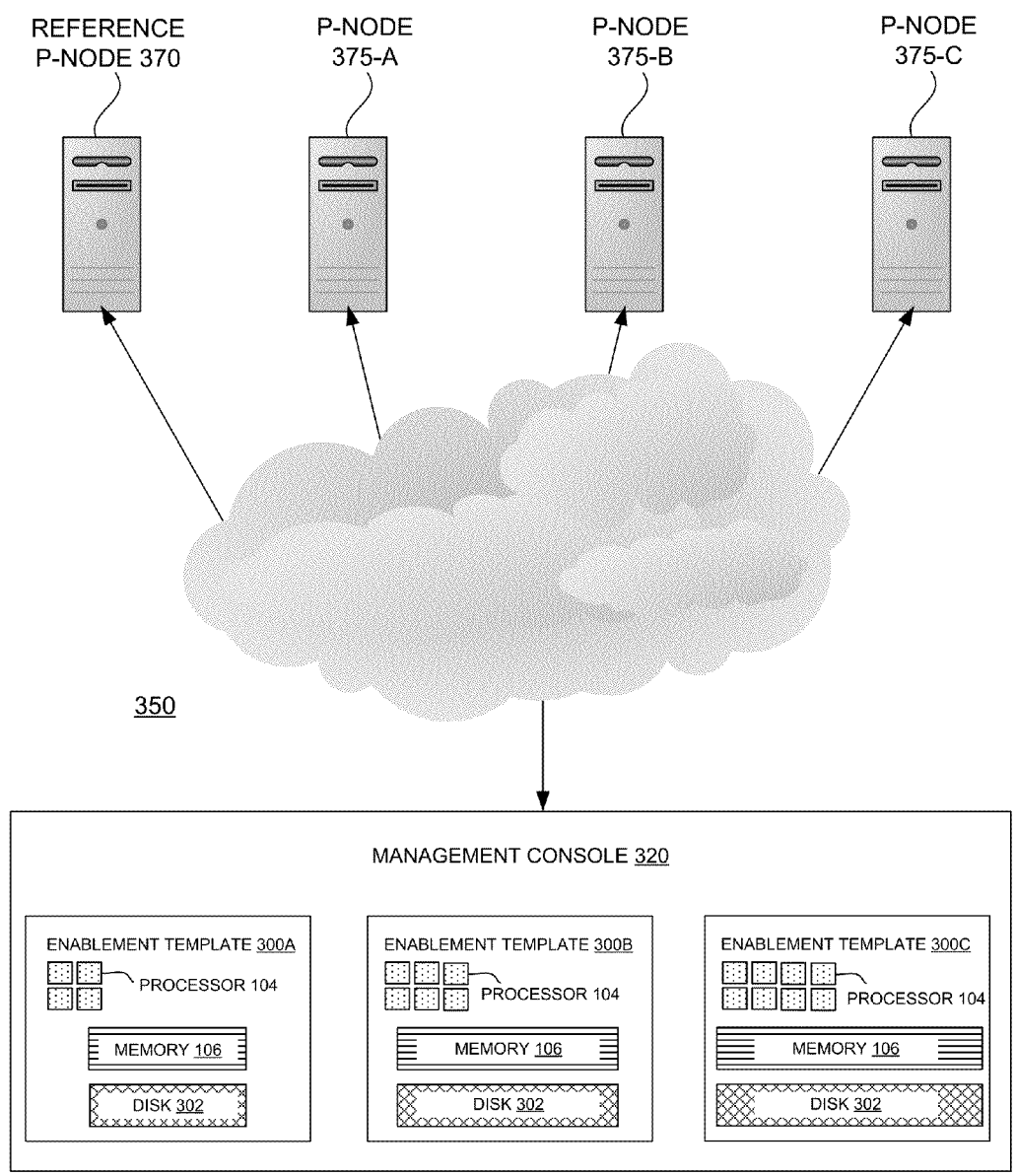
FIG. 6 illustrates an exemplary cloud environment including heterogeneous nodes, in accordance with embodiments of the present invention.

FIG. 6 illustrates an exemplary cloud environment 350 (e.g. IaaS cloud, etc.) that includes a management console 320 (e.g. cloud controller, etc.) and multiple heterogeneous nodes, which may be example, multiprocessing server computer systems, computing nodes 10, data processing systems 100, etc. A particular node within the cloud environment 350 is a reference node 370 that at least one other node 375 is benchmarked to. At least two of the nodes within cloud environment 350 are relatively heterogeneous. In other words, at least two of the nodes include different underlying physical data handling resources. For example, node 375-A may include a six core 2.0 Ghz processor, node 375B may include an eight core 2.0 Ghz processor, node 375C may include a twenty core 4.0 Ghz processor, and reference node 370 may include a ten core 3.0 Ghz processor.

Each node within cloud environment 350 includes a physical system including physical hardware devices such as processor, memory, hard drive, I/O adapters, etc. A hypervisor may deploy numerous virtual machines that are proxies for a physical system. The virtual machines are created and managed by a hypervisor that resides on each node within the cloud environment 350.

The multiple hypervisors may be managed by management console 320 (e.g. computing node 10, etc.) that includes an interface for configuring and operating the numerous nodes and/or virtual machines. For example, using the management console 320, a system administrator is able to manage the software configuration and operation of each virtual machine hosted by one or more nodes. Generally, management console 320 is a system or software implemented by a node within cloud environment 350 that interfaces with each physical node or system within the cloud environment 350 and e.g., sets an over commit value, adds or otherwise enables physical nodes into the cloud environment 350, and/or informs a cloud controller when systems are added to the cloud environment 350, etc.

A virtual machine (e.g. virtual server, virtual computer, etc.) appears to be a physical machine to its user. For example, each virtual machine appears to its software to include its own processor(s), memory, and I/O adapter(s) that are available for the exclusive use of that virtual machine. Each virtual machine supports its own software environment, including an operating system, middleware, and applications. The software environment of each virtual machine can be different from the software environment of other virtual machines. For example, the operating systems executed by each virtual machine may differ from one another. The hypervisor manages the mapping between the virtual machine with their virtual processors, virtual memory, virtual disk, virtual I/O adapters to the associated physical hardware resources of the host node.

Each hypervisor is responsible for dynamically creating, managing, and destroying virtual machines. In embodiments, the hypervisor may deploy virtual machines based upon a particular virtual machine image amongst a plurality of various virtual machine images. The various images may be stored within each node or within management console 320 or are otherwise assessable by each local hypervisor. Upon the hypervisor deploying virtual machines from associated images, each virtual machine is unique relative to other virtual machines and typically includes distinct MAC addresses and/or other virtual machine identifiers. Deploying multiple virtual machines from a single image may be useful when numerous identical virtual machines would be beneficial. For example, a virtual machine may be deployed for each employee of an organization wherein each virtual machine includes a suite of preconfigured office applications. Further, the image can be configured with a complete development environment and then cloned repeatedly as a baseline configuration for software testing. Even further, an education institution can deploy a virtual machine for each student, with all the lessons and labs required for the term. In other words, by deploying virtual machines, one may conveniently make complete copies of a virtual machine image. In embodiments, the virtual machines deployed by hypervisor may be a Full Clone of a particular virtual machine image or a Linked Clone of a particular virtual machine image.

In embodiments, various node enablement templates 300 may be included within cloud environment 350. Generally, an enable template 300 includes resource capacities and a user-side overcommit value. For example, an enablement template 300 may include processor 104 capacity, memory 106 capacity, and disk 302 (e.g. system 34, etc.) capacity and a user-side overcommit value. More particularly each enablement template 300 may include processor relative speed, memory size, memory relative speed, disk space, and relative disk speed and a user-side overcommit value. A particular enablement template 300 may be chosen by the cloud environment 350 user or customer that best fits the user's needs. For example, a particular enablement template may be chosen by the cloud environment 350 customer.

For example, the cloud environment 350 user anticipates low priority workload may be best accomplished by a node equivalent of enablement template 300A that includes a relatively small amount of computing capacity and high overcommit while being associated with a relatively low cost. The cloud environment 350 user may desire for higher priority workload to be accomplished by a node equivalent of enablement template 300B that includes more computing capacity and a lower overcommit value while being associated with a higher cost. Finally, the cloud environment 350 user may desire for higher priority workload to be accomplished by a node equivalent of enablement template 300C that includes even more computing capacity and an even lower overcommit value while being associated with a higher cost. In embodiments, the cloud environment 350 customer may create one or more enablement templates 300. In other embodiments, the cloud environment 350 operator may create one or more enablement templates 300 later chosen by the cloud environment 350 user.

In embodiments, enablement templates 300 may be stored within management console 320 and may be referenced when enabling a node 375 within cloud environment 350. Though three different enablement templates 300 are shown, a greater number of templates may be utilized within cloud environment 350. In embodiments, enablement template 300 includes distinct resource capacity values associated with one or more computing resources and a distinct user-side overcommit value. In other embodiments, enablement template 300 includes a range of resource capacity values associated with one or more computing resources and a range of user-side overcommit values.

In embodiments, the user-side overcommit value indicates the degree equivalent physical system resources of a node as defined by enablement template 300 are overcommitted. For example, enablement template 300C may be associated with a 1 overcommit value that indicates that no equivalent physical system resources of the node as defined by template 300C are to be overcommitted. In embodiments, the user-side overcommit value is or may be modified to become a multiplicative overcommit factor. For example, an enablement template 300 associated with a user-side overcommit value of 1.3 indicates the equivalent physical system resources of a node as defined by template 300 are overcommitted by a third.

In certain embodiments, the various enablement templates 300 may be normalized to reference node 370. For example, reference node 370 may be benchmarked to determine its resource capacities. Alternatively, the reference node 370 resource capacities may be previously known to cloud environment 350 operator. One or more capacities of reference node 370 may be compared to one or more capacities associated with enablement templates 300 and one or more user-side normalization factors may be determined. Generally, the user-side normalization factor(s) indicate the degree of computing capacity of the various enablement templates 300 normalized against the computing capacity of reference node 370. For example, the resources of an enablement template 300B may be normalized against the resources of reference node 370 as having 50% less capacity than reference node 370. Further, the resources of another enablement template 300C may be normalized against the resources of reference node 370 as having 225% greater capacity than reference node 370.

Such embodiments may be advantageous so as to allow different types of physical nodes to be enabled within cloud environment. For example, new and old hardware may be enabled within cloud environment. Since, new nodes will generally run much faster, the nodes may be normalized so that associated resources so as to provide efficient virtual machine resources to the user.

In embodiments, a node 375 to be enabled within cloud environment 350 may also be normalized to reference node 370. For example, node 375 may be benchmarked to determine its resource capacities or the node 375 resource capacities may be previously known to cloud environment 350 operator. One or more capacities of node 375 may be compared to one or more capacities of reference node 370 and one or more host-side normalization factors may be determined. Generally, the host-side normalization factor(s) indicate the degree of computing capacity of node 375 normalized against the computing capacity of reference node 370. For example, the resources of node 375A may be normalized against the resources of reference node 370 as having 37% less capacity than reference node 370. Further, the resources of enablement template 375C may be normalized against the resources of reference node 370 as having 275% greater capacity than reference node 370.

In embodiments, the host-side normalization factor may be utilized to equate the capacities of heterogeneous nodes 375 to the capacities reference node 370. Likewise, the user-side normalization factor may be utilized to equate the capacities of the enablement templates 300 with to the capacities of reference node 370. In embodiments, the new node 375 added to the cloud environment 350 and enabled to perform workload in accordance with a particular enablement template 300. The host-side normalization factor and the user-side normalization factor may be utilized to set a host-side overcommit value.

The host-side over overcommit value indicates the degree the physical system resources of the node 375 are overcommitted to achieve the equivalent user-side over commit value after normalizing for the actual capacities of the node 375. For example, after benchmarking node 375C it is determined that node 375C has 275% more capacity than reference node 370. It may also be that node 375C is enabled for workload associated with enablement template 300A which may have 40% less capacity than reference node 370 and be associated with a user-side overcommit value of 3. Both the user-side normalization factor and the host-side normalization factor may be used to determine the host-side overcommit value of approximately 20 ((3/0.4)*2.75)) that is equivalent to the user-side overcommit value of 3 normalizing for the capacity differences between node 375C and enablement template 300A. In embodiments, the host-side overcommit value is or may be modified to become a multiplicative overcommit factor. For example, node 375 associated with a host-side overcommit value of 1.3 indicates the physical system resources of node 375 are overcommitted by a third. Thus, the host-side overcommit value is more accurately set upon a new node 375 after normalizing for its physical computing capacities. In this manner the node 375 may deploy a number of virtual machines to optimize the utilization of the physical resources therein.

FIG. 7 illustrates exemplary node enablement templates 300A-300C along with resource capacities of reference node 370 in table format. In an exemplary embodiment, reference node 370 is benchmarked to determine one or more resource capacities. For example, known computer program(s) or other operations, are run upon reference node 370 to assess the relative performance characteristics of various node 370 hardware, for example, node 370 processing unit speed, number of processing unit cores, memory clock speed, memory size, rate of data transfer from disk, disk size, etc. Though exemplary capacity metrics are shown within reference node 370 capacities and template 300 capacities in FIG. 7, other or additional capacity metrics (e.g. memory latency, disk rotation speed, seek time, etc.) may be include within reference node 370 and template 300 capacities, respectively.

In embodiments, each enable template 300 includes resource capacities and a user-side overcommit value. For example, an enablement template 300 may include processor 104 capacity, memory 106 capacity, and disk 302 (e.g. system 34, etc.) capacity and a user-side overcommit value. More particularly each enablement template 300 may include processor size (e.g. CPU core count, etc.) processor relative speed (e.g. 3.0 Ghz, etc.), memory size (e.g. memory storage capacity, etc.), memory relative speed (e.g. memory clock speed, data retrieval speed, etc.), disk space (e.g. disk storage capacity, etc.), and relative disk speed (e.g. data retrieval speed, etc.) and a user-side overcommit value.

In embodiments, enablement template 300 may include distinct resource capacity values (e.g. see a distinct value for CPU Speed in FIG. 7, etc.) associated with one or more computing resources. In other embodiments, enablement template 300 includes a range of resource capacity values (e.g. see a range of CPU core count in FIG. 7, etc.) associated with one or more computing resources and a range of user-side overcommit values.

FIG. 8A-FIG. 8D illustrate normalizing node enablement templates 300A-300C to reference node 370. In embodiments, similar capacity metrics are normalized to (e.g. mapped to, etc.) capacity metrics of reference node 370. In FIG. 8A, virtual processor (e.g. virtual processor 120, etc.) capacity is determined based upon physical processor capacity of reference node 370 and virtual processor capacity is determined from each enablement template 300A-300C. For example, 6 virtual CPUs may be available per each CPU core. The relative processor speed of reference node 370 is set to 1. Therefore, reference node 370 may host 60 virtual processors ((6 vCPU/core)*10 cores*1.0 relative speed). Likewise, template 300A may host 15-24 virtual CPUs, template 300B may host 24-32 virtual CPUs, and template 300C may host 63-100 virtual CPUs, as normalized to reference node 370, respectively. The relative virtual CPUs capacity hosted by templates 300A-300C may be divided by the virtual CPU capacity of reference node 370 to generate virtual CPU user-side normalization values. For example, template 300A may host 25%-40% of the virtual CPU capacity relative to reference node 370, template 300B may host 40%-53% of the virtual CPU capacity relative to reference node 370, and template 300C may host 105%-267% of virtual CPU capacity relative to reference node 370.

In FIG. 8B, virtual memory (e.g. virtual memory 122, etc.) capacity is determined based upon physical memory capacity of reference node 370 and from each enablement template 300A-300C. For example, each virtual memory segment may be 10 Gb. The relative memory speed of reference node 370 is set to 1. Therefore, reference node 370 may host 100 virtual memory segments. Likewise, template 300A may host 40-100 virtual memory segments, template 300B may host 50-100 virtual memory segments, and template 300C may host 400-2000 virtual memory segments, as normalized to reference node 370, respectively. The relative virtual memory capacity hosted by templates 300A-300C may be divided by the virtual memory capacity of reference node 370 to generate virtual memory normalization values. For example, template 300A may host 40%-100% of the user-side virtual memory capacity relative to reference node 370, template 300B may host 50%-200% of the virtual memory capacity relative to reference node 370, and template 300C may host 400%-2000% of the virtual memory capacity relative to reference node 370.

In FIG. 8C, virtual disk capacity is determined based upon physical disk capacity of reference node 370 and from each enablement template 300A-300C. For example, each virtual disk segment may be 2 Tb. The relative disk speed of reference node 370 is set to 1. Therefore, reference node 370 may host 50 virtual disk segments. Likewise, template 300A may host 10-40 virtual disk segments, template 300B may host 40-250 virtual disk segments, and template 300C may host 250-400 virtual disk segments, as normalized to reference node 370, respectively. The relative virtual disk capacity hosted by templates 300A-300C may be divided by the virtual disk capacity of reference node 370 to generate user-side virtual disk normalization values. For example, template 300A may host 20%-80% virtual disk capacity relative to reference node 370, template 300B may host 80%-500% of the virtual disk capacity relative to reference node 370, and template 300C may host 500%-800% of the virtual disk capacity relative to reference node 370.

In FIG. 8D, a combined user-side normalization value may be determined from the virtual CPU user-side normalization factor, virtual memory user-side normalization factor, virtual disk user-side normalization factor, and/or other user-side virtual resource (e.g. virtual networking resources, etc.) normalization values. The combined user-side normalization value may be determined by weighting each respective user-side normalization factor respectively. For example, virtual CPU capacity may be weighted at 95%, virtual memory capacity may be weighted at 4%, and virtual disk capacity may be weighted at 1%. The combined user-side normalization values associated with each template 300A-300C generally indicate the relative capacities of each template against the capacities of reference node 370. For example, template 300A may have 25%-42% capacity relative to reference node 370, template 300B may have 40%-63% capacity relative to reference node 370, and template 300C may have 120%-340% of the capacity relative to reference node 370. In embodiments, the combined user-side normalization value may be a range, as is shown in FIG. 8D or may be a discrete value associated with each template 300A-300C.

FIG. 9 illustrates exemplary capacities of nodes 375A-375C along with resource capacities of reference node 370 in table format. In an exemplary embodiment, reference node 370 and nodes 375A-375C are benchmarked to determine resource capacities. For example, known computer program(s) or other operations, are run upon reference node 370 to assess the relative performance characteristics of various node 370, 375 hardware, for example, node 370, 375 processing unit speed, number of processing unit cores, memory clock speed, memory size, rate of data transfer from disk, disk size, etc. Though exemplary capacity metrics are shown within reference node 370, 375 capacities in FIG. 9, other or additional capacity metrics (e.g. memory latency, disk rotation speed, seek time, etc.) may be include within reference node 370 and nodes 375 capacities, respectively.

In embodiments, each node 375 includes resource capacities similar to those measured or known with respect to reference node 370. For example, a node 375 may include processor 104 capacity, memory 106 capacity, and disk 302 (e.g. system 34, etc.) capacity and a user-side overcommit value. More particularly, each node 375 capacity may include processor size (e.g. CPU core count, etc.) processor relative speed (e.g. 3.0 Ghz, etc.), memory size (e.g. memory storage capacity, etc.), memory relative speed (e.g. memory clock speed, data retrieval speed, etc.), disk space (e.g. disk storage capacity, etc.), and relative disk speed (e.g. data retrieval speed, etc.). In embodiments, a node 375 may include distinct resource capacity values (e.g. see a distinct value for CPU Speed in FIG. 9, etc.) associated with one or more computing resources.

FIG. 10A-FIG. 10D illustrates normalizing heterogeneous nodes 375 to reference node 370. In FIG. 10A, virtual processor capacity is determined based upon physical processor capacity of reference node 370 and virtual processor capacity is determined from each node 375. Node 375A may host 24 virtual CPUs, node 375B may host 32 virtual CPUs, and node 375C may host 160 virtual CPUs, as normalized to reference node 370, respectively. The relative virtual CPUs capacity hosted by nodes 375 may be divided by the virtual CPU capacity of reference node 370 to generate cloud side virtual CPU normalization values. For example, node 375A may include 40% of the virtual CPU capacity relative to reference node 370, node 375B may host 53% of the virtual CPU capacity relative to reference node 370, and node 375C may host 160% of virtual CPU capacity relative to reference node 370.

In FIG. 10B, virtual memory capacity is determined based upon physical memory capacity of reference node 370 and from each node 375A-375C. Node 375A may host 40 virtual memory segments, node 375B may host 50 virtual memory segments, and node 375C may host 400 virtual memory segments, as normalized to reference node 370, respectively. The relative virtual memory capacity hosted by node 375A-375C may be divided by the virtual memory capacity of reference node 370 to generate host-side virtual memory normalization values. For example, node 375 may include 40% of the virtual memory capacity relative to reference node 370, node 375B may include 50% of the virtual memory capacity relative to reference node 370, and node 375C may include 400% of the virtual memory capacity relative to reference node 370.

In FIG. 10C, virtual disk capacity is determined based upon physical disk capacity of reference node 370 and from each node 375A-375C. Node 375A may host 100 virtual disk segments, node 375B may host 40 virtual disk segments, and node 375C may host 250 virtual disk segments, as normalized to reference node 370, respectively. The relative virtual disk capacity hosted by nodes 300A-300C may be divided by the virtual disk capacity of reference node 370 to generate host-side virtual disk normalization values. For example, node 375 may include 20% of the virtual disk capacity relative to reference node 370, node 375B may include 50% of the virtual disk capacity relative to reference node 370, and node 375C may include 500% of the virtual disk capacity relative to reference node 370.

In FIG. 10D, a combined host-side normalization value may be determined from the host-side virtual CPU normalization factor, host-side virtual memory normalization factor, host-side virtual disk normalization factor, and/or other cloud side virtual resource (e.g. virtual networking resources, etc.) normalization values. The combined host-side normalization value may be determined by weighting each respective host-side normalization factor respectively. For example, virtual CPU capacity may be weighted at 95%, virtual memory capacity may be weighted at 4%, and virtual disk capacity may be weighted at 1%. The combined host-side normalization values associated with each node 375A-375C generally indicate the relative capacities of each node 375A-375C against the capacities of reference node 370. For example, node 375A may have 37% capacity relative to reference node 370, node 375B may have 53% capacity relative to reference node 370, and node 375C may have 275% of the capacity relative to reference node 370.

Figure 11:
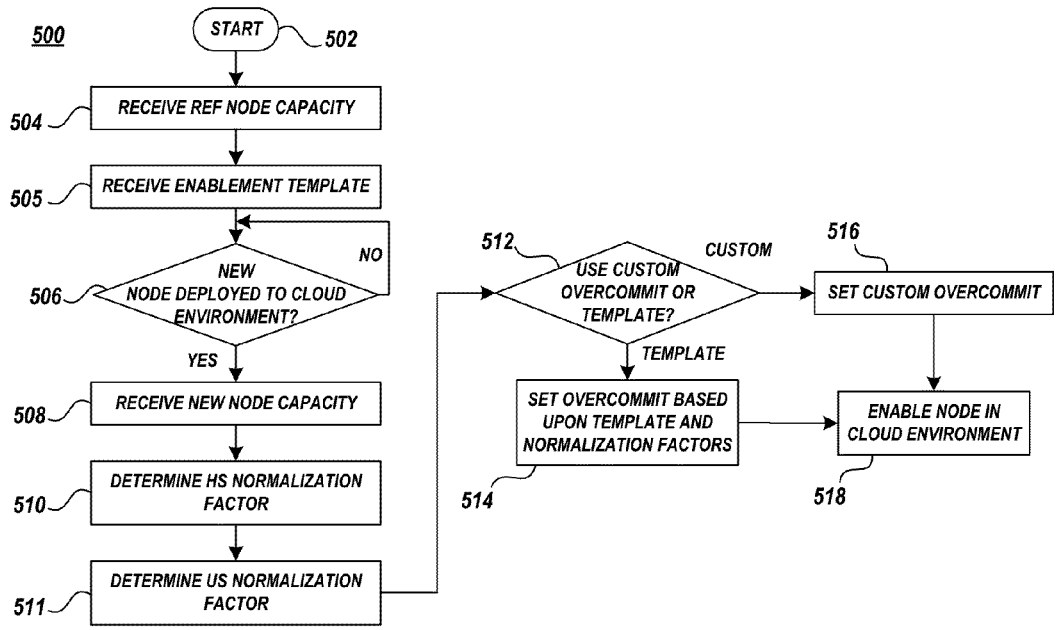
FIG. 11 illustrates an exemplary node enablement scheme, in accordance with embodiments of the present invention.

FIG. 11 illustrates an exemplary node enablement method 500, in accordance with embodiments of the present invention. Method 500 may be utilized by e.g., management console 320 when enabling new nodes 375 within cloud environment 350. Method 500 begins at block 502 and continues with management console 320 receiving reference node 370 capacities (block 504). For example, management console 320 may run benchmark tests upon reference node 370 to determine physical resource capacities, such as processor capacity, memory capacity, disk capacity, etc. Method 500 may continue by the management console 320 receiving one or more enablement templates 300 (block 505). For example, the management console 320 may receive a particular enablement template 300 associated with cloud environment 350 user selection. Alternatively the management console 320 may receive various enablement templates 300 that the cloud environment 350 user may select therefrom.

Method 500 may continue by the management console 320 determining if a new node 375 has been installed or otherwise will be enabled within cloud environment 350 (block 506). If a new node 375 is to be enabled within cloud environment 350, capacities of the new node 375 are received by management console 320 (block 508). For example, management console 320 may run benchmark tests upon new node 375 to determine physical resource capacities, such as processor capacity, memory capacity, disk capacity, etc. Alternatively, the capacities of the new node 375 may be known to the cloud environment 350 operator and may be inputted into management console 320.

Method 500 may continue by determining a host-side normalization factor associated with at least one physical resource of the new node 375 (block 510). For example, the management console 320 may determine a processor cloud side normalization factor that relates the relative processing capacity of the new node 375 to the reference node 370. Method 500 may continue by determining a user-side normalization factor associated with at least one physical resource associated with a enablement template 300 (block 511). For example, the management console 320 may determine a memory user side normalization factor relates the relative memory capacity of the enablement template 300 to the reference node 370. In other examples, the management console 320 may determine a combined host-side normalization factor and/or a combined user-side normalization factor that relates associated capacities of the new node 375 and the enablement template 300 to the reference node 370, respectively.

Method 500 may continue by the management console 320 determines if further processing should occur utilizing the user-side overcommit value associated with a particular enablement template or utilizing a custom overcommit value (block 512). For example, a default may be set to automatically utilize the user-side overcommit value associated with the particular template 300 selected by the cloud environment 320 user unless overridden by a custom user-side overcommit value as specified by e.g., a cloud environment 350 administrator upon the management console 320.

Method 500 may continue by the management console 320 determining a host-side overcommit value based upon the user-side normalization factor and the host-side normalization factor if the management console 320 determines further processing should occur utilizing the user-side overcommit value associated with a particular enablement template at block 512 (block 514). Method 500 may continue by the management console 320 setting the custom overcommit value (block 516). Method 500 may continue with management console 518 enabling the new node 375 (e.g. so that it may accomplish workload, etc.) within cloud environment 350 (block 518).

Figure 12:
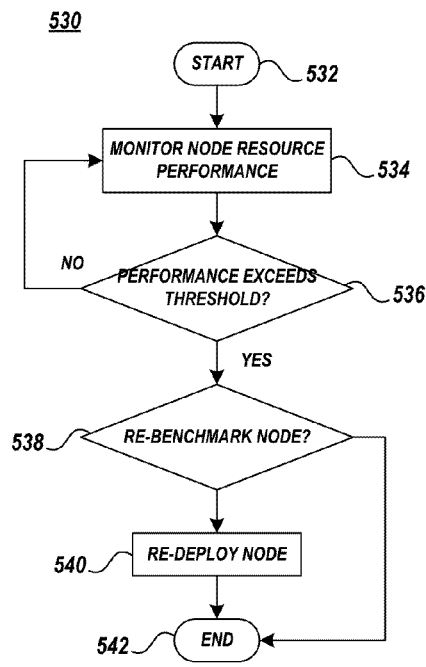
FIG. 12 illustrates an exemplary node re-deployment scheme, in accordance with embodiments of the present invention.

FIG. 12 illustrates an exemplary node re-deployment method 530, in accordance with embodiments of the present invention. Method 530 may be utilized by e.g., management console 320 to re-enable a node 375 within cloud environment 350. Method 530 begins at block 532 and continues with management console 320 monitoring node 375 computing performance (block 534). For example, a computing resource monitor may measure processor, memory, disk, etc. utilization.

Method 530 may continue by management console 320 determining if the measured computing performance of node 375 is above a threshold (block 536). For example, utilization of the processor, memory, disk, etc. of the node 375 may be higher than a threshold as defined by the selected enablement template 300.

Method 530 may continue by management console 320 determining if the previously enabled node 375 should be re-enabled (block 538). For example, the management console 320 may alert the cloud environment administrator via the management console 320 that the measured computing performance is above an associated threshold and query whether the node 375 should be re-enabled.

Method 530 may continue by re-enabling the node 375 by returning to block 508, etc. of method 500 if it determined if the previously enabled node 375 should be re-enabled. Method 530 ends at block 542.

Figure 13:
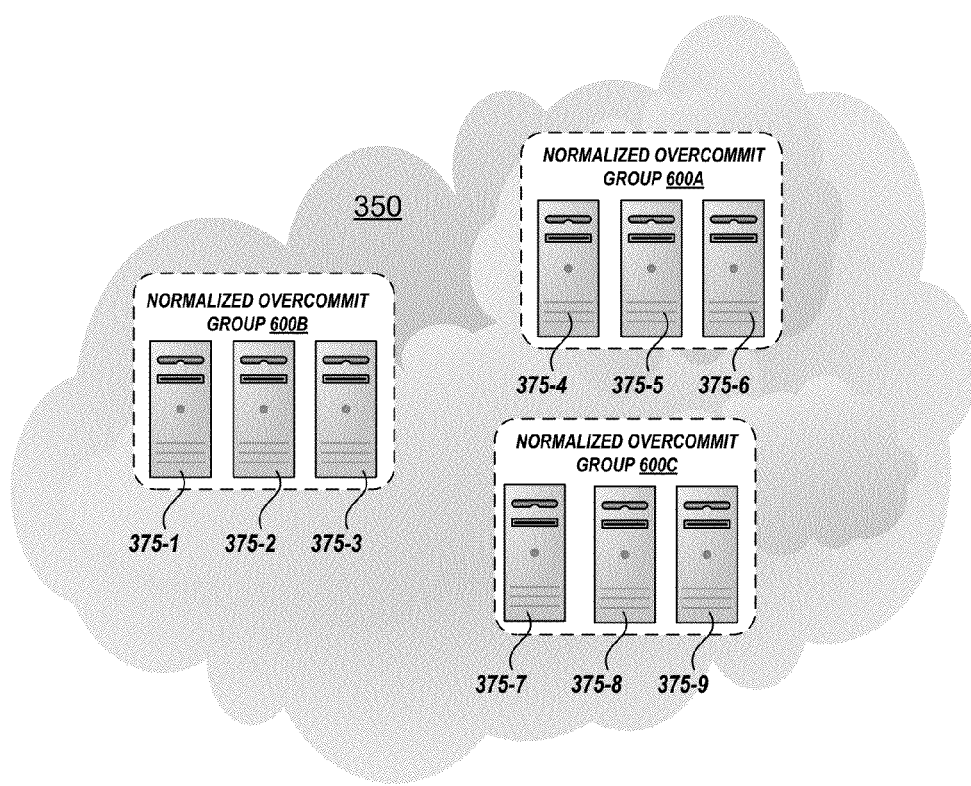
FIG. 13 illustrates an exemplary groupwise node enablement scheme, in accordance with embodiments of the present invention.

FIG. 13 illustrates an exemplary groupwise node 375 enablement scheme wherein multiple nodes 375 are enabled within cloud environment 350 by their associated overcommit values. For example, node 375-1, 375-2, and 375-3 may be associated with respective host-side normalized values within a range of normalized values and may be enabled in a group 600B, node 375-4, 375-5, and 375-6 may share a host-side normalized value and enabled within a group 600A, node 375-7, 375-8, and 375-9 may be associated with respective host-side normalized values within a range and may be enabled in a group 600C. Therefore, even though the computing capacities of each node 375 may differ, multiple nodes 375 may be groupwise enabled by their respective host-side overcommit values.

Embodiments of the present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over those found in the marketplace, or to enable others of ordinary skill in the art to understand the embodiments disclosed herein.

What is claimed is:

1. A computer program product for overcommitting a physical node implementing a plurality of virtual machines (VM Node), the computer program product comprising a computer readable storage medium having program instructions embodied therewith, the program instructions readable to cause a management console to:
   receive a selected enablement template comprising a selected computing capacity and a selected overcommit value, wherein the selected enablement template is selected by a user of the VM node and wherein the selected overcommit value indicates an amount an equivalent computing capacity defined by the selected template is overcommitted;
   determine a user-side normalization factor to normalize the selected computing capacity against a physical reference node, wherein the user-side normalization factor equates the equivalent computing capacity defined by the selected enablement template with the physical reference node;
   receive a comparable computing capacity of the VM Node, wherein the VM Node is benchmarked to determine a performance metric of the comparable computing capacity;
   determine a host-side normalization factor to normalize the comparable computing capacity against the reference node, wherein the host-side normalization factor equates the comparable computing capacity of the VM node with the physical reference node, and;
   set a host-side overcommit value upon the VM Node as determined from the selected overcommit value, the user-side normalization factor, and the host-side normalization factor wherein the host-side overcommit value indicates the degree the comparable computing capacity is overcommitted to the plurality of virtual machines implemented upon the VM Node.

2. The computer program product of claim 1, wherein the program instructions further cause the management console to:
   enable the VM Node within a network, and;
   monitor utilization of the comparable computing capacity.

3. The computer program product of claim 2, wherein the program instructions further cause the management console to:
   determine whether the monitored utilization of the comparable computing capacity exceeds a threshold.

4. The computer program product of claim 1, wherein the program instructions further cause the management console to:
   receive a reference computing capacity of the reference node.

5. The computer program product of claim 4, wherein the reference computing capacity of the reference node is received by benchmarking the reference node.

6. A virtual machine data handling network comprising:
   a physical reference node comprising a physical resource having an associated reference computing capacity;
   a physical node that implements a plurality of virtual machines (VM Node), the VM Node comprising a comparable physical resource having an associated host computing capacity;
   a management console system comprising a selected enablement template comprising a selected computing capacity and a selected overcommit value, the management console system configured to determine a user-side normalization factor to normalize the selected computing capacity against the reference computing capacity, to determine a host-side normalization factor to equate the comparable computing capacity to the reference computing capacity, to determine a host-side overcommit value from the selected overcommit value, the user-side normalization factor, and the host-side normalization factor, and to set the host-side overcommit value to the VM Node, wherein the selected enablement template is selected by a user of the VM Node, wherein the selected overcommit value indicates an amount an equivalent computing capacity defined by the selected enablement template, wherein the user-side normalization factor equates the equivalent computing capacity defined by the selected enablement template with the physical reference node, wherein the host-side normalization factor equates the comparable computing capacity of the VM Node with the physical reference node, and wherein the host-side overcommit value indicates the degree the comparable computing capacity is overcommitted to the plurality of virtual machines upon the VM Node.

7. The virtual machine data handling network of claim 6, wherein the management console system is further configured to:

enable the VM Node within a network, and;

monitor utilization of the comparable computing capacity.

8. The virtual machine data handling network of claim 7, wherein the management console system is further configured to:

determine whether the monitored utilization of the comparable computing capacity exceeds a threshold.

9. The virtual machine data handling network of claim 7, wherein the management console system is further configured to:

receive a reference computing capacity of the reference node.

10. The virtual machine data handling network of claim 9, wherein the reference computing capacity of the reference node is received by benchmarking the reference node.

* * * * *